(12) United States Patent
Suzuki et al.

(10) Patent No.: US 8,926,768 B2
(45) Date of Patent: *Jan. 6, 2015

(54) HIGH-STRENGTH AND HIGH-DUCTILITY STEEL FOR SPRING, METHOD FOR PRODUCING SAME, AND SPRING

(75) Inventors: Takeshi Suzuki, Yokohama (JP); Yoshiki Ono, Yokohama (JP)

(73) Assignee: NHK Spring Co., Ltd., Yokohama-Shi (JP)

( * ) Notice: Subject to any disclaimer, the term of this patent is extended or adjusted under 35 U.S.C. 154(b) by 469 days.

This patent is subject to a terminal disclaimer.

(21) Appl. No.: 13/258,014

(22) PCT Filed: Mar. 8, 2010

(86) PCT No.: PCT/JP2010/053794
§ 371 (c)(1),
(2), (4) Date: Sep. 21, 2011

(87) PCT Pub. No.: WO2010/110041
PCT Pub. Date: Sep. 30, 2010

(65) Prior Publication Data
US 2012/0024436 A1 Feb. 2, 2012

(30) Foreign Application Priority Data
Mar. 25, 2009 (JP) .................................. 2009-073373

(51) Int. Cl.
| C21D 6/00 | (2006.01) |
| C22C 38/38 | (2006.01) |
| C22C 38/18 | (2006.01) |
| C21D 9/02 | (2006.01) |
| C22C 38/04 | (2006.01) |
| C22C 38/34 | (2006.01) |

(52) U.S. Cl.
CPC . *C21D 9/02* (2013.01); *C22C 38/04* (2013.01); *C22C 38/18* (2013.01); *C22C 38/34* (2013.01); *C21D 2211/001* (2013.01); *C21D 2211/002* (2013.01); *C21D 2211/008* (2013.01); *Y10S 148/908* (2013.01)
USPC ............................. 148/333; 148/662; 148/908

(58) Field of Classification Search
CPC ........ C22C 38/04; C22C 38/02; C22C 38/38; C22C 38/58; C22C 38/18; C22C 38/34; B24C 1/10; C21D 7/06; C21D 9/02; F16F 1/06
USPC .......... 148/333, 662, 580, 908, 595; 420/120, 420/104
See application file for complete search history.

(56) References Cited

U.S. PATENT DOCUMENTS

| 4,147,863 | A | 4/1979 | Miyadera et al. | |
| 7,438,770 | B2 * | 10/2008 | Yuse et al. ...................... | 148/320 |
| 2002/0033053 | A1 | 3/2002 | Sawai et al. | |
| 2006/0169367 | A1 * | 8/2006 | Yuse et al. ...................... | 148/320 |
| 2006/0225819 | A1 | 10/2006 | Yoshihara | |
| 2007/0125456 | A1 | 6/2007 | Kochi et al. | |
| 2013/0118655 | A1 * | 5/2013 | Suzuki et al. .................. | 148/580 |

FOREIGN PATENT DOCUMENTS

| JP | A-51-29492 | 3/1976 |
| JP | B2-58-42246 | 9/1983 |
| JP | A-63-312917 | 12/1988 |
| JP | A-5-320749 | 12/1993 |
| JP | A-2001-288530 | 10/2001 |
| JP | A-2002-48693 | 2/2002 |
| JP | A-2002-212665 | 7/2002 |
| JP | A-2005-23404 | 1/2005 |
| JP | B2-3783306 | 6/2006 |
| JP | A-2006-291291 | 10/2006 |
| JP | A-2007-100209 | 4/2007 |
| JP | A-2007-154240 | 6/2007 |

OTHER PUBLICATIONS

International Search Report dated Jun. 8, 2010 in International Application No. PCT/JP2010/053794.
Evamaria Pöpper et al., "Erzeugung and Eigenschaften von α/γ-Gefügezuständen in niedriglegiertem Federstahl," Neue Hütte, vol. 29, No. 3, 1984, pp. 92-96.
Oct. 16, 2014 extended European Search Report issued in Application No. 10755842.1.

* cited by examiner

*Primary Examiner* — Roy King
*Assistant Examiner* — Michael Aboagye
(74) *Attorney, Agent, or Firm* — Oliff PLC

(57) ABSTRACT

A steel for spring includes C: 0.5 to 0.6%, Si: 1.0 to 1.8%, Mn: 0.1 to 1.0%, Cr: 0.1 to 1.0%, P: 0.035% or less, S: 0.035% or less, by mass %, and a balance of iron and inevitable impurities, as the overall composition, wherein an area ratio of an internal structure on an optional cross section comprises bainite: 65% or more, retained austenite: 6 to 13%, and a balance of martensite, and average C content in the retained austenite is 0.65 to 1.7%. The steel for spring can have high strength in which tensile strength is 1800 MPa or more and have high ductility.

4 Claims, No Drawings

HIGH-STRENGTH AND HIGH-DUCTILITY STEEL FOR SPRING, METHOD FOR PRODUCING SAME, AND SPRING

TECHNICAL FIELD

The present invention relates to a steel for spring and to a spring having superior balance between strength and ductility, and in particular, relates to a steel for spring, to a method for producing same, and to a spring, in which reduction of ductility occurred in a steel for spring having tensile strength of 1800 MPa or more is suppressed.

BACKGROUND ART

In a suspension spring for an automobile, further weight reduction is required in order to improve automobile fuel efficiency, and in recent years, springs of steel having tensile strength of 1800 MPa or more has also been realized. However, in the case in which structure of the steel is tempered martensite, since generally the notch sensitivity is increased as the steel is strengthened, there is concern that there will be a deleterious influence on spring properties such as fatigue in corrosive environments, etc., and a steel having both high strength and high ductility, in which cracks hardly develop, is required.

In order to solve such problems, a suspension spring steel in which the toughness is improved and the delayed fracture resistance is increased by using steel in which Ni, Nb, etc., are added to standard steel composition of steel for spring regulated under the Japanese Industrial Standard, has been proposed (Patent Publication 1). In addition, a steel for spring in which the embrittlement due to hydrogen penetrating into the steel is prevented and corrosion fatigue resistance is improved by using steel in which at least one of Ti, V, Nb, Zr, and Hf is added, has been proposed (Patent Publication 2). However, since these additive elements are expensive, there is a drawback in that the cost of the steel is increased.

In addition, a high-strength and high-toughness steel in which primary structure is a tempered martensite structure and to which it is not necessary to add large amounts of Ni, Cr, etc., has been proposed (Patent Publication 3). This steel is obtained by regulating the average particle size and aspect ratio of old austenite grains, size and numbers per observed unit cross section of carbide, etc. However, there is a problem in that the process is complicated and the productivity is reduced, since it is necessary to carry out cold working having true strain of 0.2 or more at 500° C. or less before the quenching process.

Furthermore, a high-strength and high-toughness steel in which it is not necessary to add large amounts of alloying elements and special thermomechanical treatment has been proposed, and the toughness is improved by dispersing and precipitating fine carbide in austenite, and by miniaturizing substructures of martensite (Patent Publication 4). However, it is necessary to accurately control temperature and time of heating during the heating in the quenching process in order to allow undissolved carbide to remain, and there is a problem in that the process control is complicated.

In the meantime, a high-toughness steel plate of bainitic structure using a strengthening method of high-strength steel which does not use a quenching and tempering process, has been proposed (Patent Publication 5). This steel plate is obtained by heating low alloy medium carbon steel (Nb content: 0.005 to 0.2%) to an austenite range and then by isothermally holding at a temperature of Ms point or more (austempering treatment). However, it is described that the tensile strength of the obtained steel plate is at maximum about 1530 MPa and the elongation is 9.0%, and sufficient strength and elongation are not obtained. This reason is that the Patent Publication 5 discloses a technology for a steel plate having a Vickers hardness of about 400 HV, supporting carrying out after processing such as bending, reduction of area, etc., and an austempering processing condition is examined only at a relatively high temperature.

In addition, a steel for spring in which the primary structure is a bainite or martensite structure and hydrogen embrittlement resistance is improved by limiting the content of retained austenite and the aspect ratio of crystal grain, has been proposed (Patent Publication 6). Here, in the Patent Publication 6, increased amount of toughness of the steel and characteristic value of ductility such as elongation, reduction of area, etc., in a tensile test, are not described. In addition, one of the important structural factors for having both high strength and high ductility is that average C content in the retained austenite is high, as describe below. In the Patent Publication 6, the factor is not considered, and it is anticipated that the high strength is obtained, but the high ductility is difficult to realize, even if the amount and the shape of the retained austenite are controlled.

Patent Publication 1 is Japanese Patent Publication No. 3783306. Patent Publication 2 is Japanese Unexamined Patent Application Publication No. 2005-23404. Patent Publication 3 is Japanese Unexamined Patent Application Publication No. 2001-288530. Patent Publication 4 is Japanese Unexamined Patent Application Publication No. 2002-212665. Patent Publication 5 is Japanese Examined Patent Application Publication No. S51-29492. Patent Publication 6 is Japanese Unexamined Patent Application Publication No. 2007-100209.

DISCLOSURE OF THE INVENTION

Problems Solved by the Invention

An object of the present invention is to provide a steel for spring, a method for producing same, and a spring having high strength and high ductility in which tensile strength is 1800 MPa or more.

Means for Solving the Problems

The inventors have conducted various research with respect to methods for improving the ductility of the spring, and consequently, they have found that in a structure in which the primary structure is tempered martensite, the strength can be increased; however, drastic reduction of ductility with the increasing cannot basically be avoided, and that then the problem can be solved by using a structure in which bainite formed by austempering processing is the primary structure, and therefore, the present invention has been made. That is, the steel for spring of the present invention comprises C: 0.5 to 0.6%, Si: 1.0 to 1.8%, Mn: 0.1 to 1.0%, Cr: 0.1 to 1.0%, P: 0.035% or less, S: 0.035% or less, by mass %, and residue consisting of iron and inevitable impurities, as the overall composition, wherein an area ratio of an internal structure on an optional cross section comprises bainite: 65% or more, retained austenite: 6 to 13%, and martensite: residue (including 0%), and average C content in the retained austenite is 0.65 to 1.7%. In the steel for spring of the present invention, it is desirable that tensile strength be 1800 MPa or more, and that parameter Z defined below be 15000 or more.

Parameter $Z=$(Tensile Strength (MPa))×(Fracture Elongation (%))

Here, it is desirable that the steel for spring of the present invention have a diameter of 1.5 to 15 mm.

In addition, the method for producing a steel for spring of the present invention comprising: austenitizing a steel comprising C: 0.5 to 0.6%, Si: 1.0 to 1.8%, Mn: 0.1 to 1.0%, Cr: 0.1 to 1.0%, P: 0.035% or less, S: 0.035% or less, by mass %, and residue consisting of iron and inevitable impurities, as the overall composition, at a temperature of more than $Ac_3$ point and ($Ac_3$ point+250° C.) or less, cooling at a cooling rate 20° C./s or more, holding at a temperature of more than Ms point and (Ms point+70° C.) or less for 400 to 10800 seconds, and cooling to room temperature at a cooling rate of 20° C./s or more. Here, the $Ac_3$ point is a temperature boundary between an austenite single phase area and a two-phase area of ferrite+austenite observed during heating and, the Ms point is an initial temperature in which martensite is transformed from supercooled austenite during cooling. Furthermore, the spring of the present invention is made of the above steel for spring, and it is produced by the above production method.

According to the present invention, standard steels for spring according to JIS or SAE which can be easily obtained can be used as a raw material, and a high-strength and high-ductility steel for spring, a spring, and a production method, in which it is not necessary to add expensive alloying elements or use complicated thermomechanical treatment, can be provided. In addition, the steel for spring and the spring of the present invention are superior in recyclability, since the alloying element amount is low. Furthermore, the steel for spring and the spring of the present invention are produced while saving energy, since the production process is simplified in comparison with conventional steels subjected to quenching and tempering that are widely used.

BEST MODE FOR CARRYING OUT THE INVENTION

First, the reasons for limitations of the overall composition of the steel for spring of the present invention will be explained.

C: 0.5 to 0.6%

C is an element which is necessary for ensuring tensile strength of 1800 MPa or more and retained austenite. In addition, C is an important element in order to obtain a desired area ratio of the austenite at room temperature, and it is necessary to add 0.5% or more. However, when the C content is too high, the area ratio of the retained austenite, which is soft, is excessively increased and it is difficult to obtain desired strength, and therefore, the C content is set to be 0.6% or less.

Si: 1.0 to 1.8%

Si has action for suppressing precipitation of iron carbide, even if C is discharged from bainitic ferrite to austenite, and it is an essential element in order to obtain the retained austenite having high C content limited in the present invention. In addition, Si is a solute strengthening element, and it is an effective element to obtain high strength. However, when the Si content is too high, the area ratio of the retained austenite which is soft is increased and reduction of the strength occurs, and therefore, the Si content is set to be 1.8% or less.

Mn: 0.1 to 1.0%

Mn is an element added as a deoxidation element, and moreover, it is also an element in which the austenite is stabilized, and therefore, it is necessary to add 0.1% or more, in order to obtain the retained austenite which is an essential element in the present invention. In the meantime, when the content of Mn is too high, segregation is generated and it is easy to reduce workability, and therefore, the Mn content is set to be 1.0% or less.

Cr: 0.1 to 1.0%

Cr is an element in which hardenability of the steel is increased and strength is greatly improved. In addition, Cr has also an action in which pearlite transformation is delayed and the bainitic structure can be stably obtained, and therefore, it is necessary to add 0.1% or more. However, when the Cr content is added over 1.0%, it is easy to produce iron carbide and it is difficult to produce the retained austenite, and therefore, the Cr content is set to be 1.0% or less.

P: 0.035% or Less, S: 0.035% or Less

P and S are elements that promote grain boundary fracture by grain boundary segregation, and therefore, it is desirable that the content of each be low, and it is necessary that upper limit thereof be 0.035%. It is preferably that the content be 0.01% or less.

Next, limitation reasons of area ratio of phases in the overall structure will be explained.

Bainite: 65% or More

Bainite is a microstructure produced by isothermal transformation (bainitic transformation) of austenitized steel at a low temperature in a metal bath, a salt bath, etc., and then by cooling to room temperature, and it is composed of bainitic ferrite and iron carbide. The bainitic ferrite, which is the base in the bainitic structure, has high dislocation density and the iron carbide has a precipitation strengthening effect, and therefore, the strength can be increased by using the bainitic structure. In the tempered martensite structure, it is easy to reduce the ductility, since the iron carbide precipitation in an old austenite grain boundary and the grain boundary strength is reduced. In contrast, the bainitic structure can be prevented from reducing the ductility, since it is a structure in which iron carbide is minutely precipitated in the bainitic ferrite base and the grain boundary strength is hardly reduced. Thus, the bainite has the indispensable structure for obtaining high intensity and high ductility, and it is preferable that the area ratio thereof be higher, and it is necessary that it be 65% or more in order to obtain the high strength and high ductility limited in the present invention. A structure having an area ratio of bainite of less than 65% can be produced by water-cooling after the bainitic transformation is progressed to an initial stage or a middle stage. Generally, untransformed austenite during the above isothermal holding is transformed martensite or retained austenite by cooling as described below. Since the C content of untransformed austenite at the initial stage or the middle stage of the bainitic transformation is small, in the case in which the area ratio of bainite is 65% or less, most of the untransformed austenite is transformed martensite by cooling and part of the untransformed austenite is remained as an austenite. Therefore, when the area ratio of bainite is 65% or less, the high intensity is obtained since the martensite is increased; however, the high strength and high ductility limited in the present invention cannot be satisfied, since the ductility is greatly reduced.

Retained Austenite: 6 to 13%

The retained austenite has a structure which is effective for increasing ductility and hardening strain using the TRIP (transformation-induced plasticity) phenomenon. It is necessary that the retained austenite be 6% or more, in order to obtain high ductility; however, material strength is remarkably reduced when the retained austenite is too great, since the retained austenite is soft. Therefore, the retained austenite is set to be 13% or less.

Martensite: Residue (0% is Contained)

The martensite can exist at a desired suitable amount depending on tensile strength.

Average C Content in Retained Austenite: 0.65 to 1.7%

It is an indispensable condition that the average C content in the retained austenite is high, in order to obtain high strength and high ductility. The C content in the retained austenite is increased by discharging C from bainitic ferrite to supercooled austenite (it remains as a result) at surroundings thereof during the above isothermal transformation, and therefore, the C content is locally different in the retained austenite. In addition, the higher the C content in the retained austenite, the more stable the phase, even if it is transformed, and the retained austenite tends to hardly transform to plastic induced martensitic phase. Therefore, in an initial stage of the plastic deformation, the retained austenite in which the C content is relatively low is transformed to martensite by TRIP and is hardened, so that the ductility is improved and the plastic deformation is progressed, and the ductility is held by stably existing the retained austenite having high C content which is not transformed to martensite. As a result, the high ductility of steel can be realized. It is necessary that the C content in the retained austenite be 0.65% or more in order to satisfy the high strength and the high ductility limited in the present invention. In the case in which the C content is less than 0.65%, since most of the retained austenite is transformed and hardened by TRIP, when plastic deformation is progressed ductility can be not further improved and the high strength and the high ductility limited in the present invention is not satisfied. Here, the C content in the untransformed austenite is not increased over a specific value, since iron carbide is formed when the C content in the untransformed austenite is too high as describe below. Therefore, the upper limit of the C content in the retained austenite is realistically set to be about 1.7%.

It is desirable that the tensile strength of the steel for spring be 1800 MPa or more in order to reduce the weight of the spring. Generally, the tensile strength and the fracture elongation which is one of representative characteristic values showing the ductility have the relationship of trade off, and it is desirable that parameter Z described below be 15000 or more when the tensile strength is 1800 MPa or more. The steel for spring of the present invention which satisfies the following expression has a clear advantage to quenched martensite widely used.

$$\text{Parameter } Z = (\text{Tensile Strength (MPa)}) \times (\text{Fracture Elongation (\%)})$$

Primary applications of the steel for spring of the present invention are a suspension spring and a valve spring for automobiles, and it is desirable that the diameter of the steel for spring be 1.5 to 15 mm in order to satisfy the requirement.

In the following, the method for producing the steel for spring of the present invention will be explained. The steel for spring of the present invention is produced by isothermally holding and then cooling, so as to bainitize a structure of the steel, after the steel of the above composition is austenitized. The structure of the steel before austenitizing is not specifically limited. For example, bar steels subjected to hot forging and or wire drawing process can be used as a material.

It is necessary that temperature of the austenitizing be more than an $Ac_3$ point and ($Ac_3$ point+250° C.) or less. When the temperature is $Ac_3$ point or less, the steel is not austenitized, and the desire structure can be not produced. In addition, when it is more than ($Ac_3$ point+250° C.), it is easy to coarsen the prior austenite grain size, and there is a possibility that the ductility will be reduced.

The faster the cooling ratio to isothermal holding temperature after the austenitizing, the better the production method of the steel, and it is necessary that the cooling ratio be 20° C./s or more, and it is preferable that it be 50° C./s or more. When the cooling ratio is less than 20° C./s, the desired structure can be not produced, since the pearlite is formed during the cooling.

It is necessary that the isothermal holding temperature be more than Ms point and (Ms point+70° C.) or less, and the temperature herein is a very important controlling element in the method for producing the steel for spring and the spring of the present invention. When the isothermal holding temperature is Ms point or less, hard martensite which inhibits improvement of the ductility in the transformation initial stage of the bainitizing is formed and the desire area ratio of the bainite cannot be obtained. In the meantime, when the isothermal holding temperature is more than (Ms point+70° C.), substructures and carbide of the bainitic ferrite coarsen, and the tensile strength is reduced. It is necessary that time for isothermally holding be 400 to 10800 seconds, and this time is also a very important controlling element in the production method for producing the steel for spring of the present invention. When the isothermal holding time is less than 400 seconds, the bainitic transformation is hardly progressed, and therefore, the bainite area ratio is decreased and the structure limited in the present invention cannot be produced. In addition, when the isothermal holding time is more than 10800 seconds, the untransformed austenite amount relatively decreases, since C discharged from the bainitic ferrite is supersaturated in the untransformed austenite and a large amount of iron carbide is precipitated from the untransformed austenite. As the result, since the area ratio of the retained austenite formed after the cooling is decreased, the structure limited in the present invention cannot be achieved.

In order to obtain uniform structure, the faster the cooling ratio after isothermally holding, the better the method for producing the steel, and it is necessary that the cooling ratio be 20° C./s or more, and it is preferable that it be 50° C./s or more. For example, the cooling can be carried out by oil-cooling or water-cooling. When the cooling ratio is less than 20° C./s, there may be untransformed on the surface and the inside of the steel, and there may be a case in which the structure limited in the present invention cannot be produced.

EXAMPLES

Steels A to C consisted of component composition shown in Table 1 were prepared, and each steel was melted in a vacuum high-frequency induction furnace to form 50 kg of a steel ingot, and was forged at 1180° C. in a shape having a diameter of 12 mm. In addition, this steel bar was heated at 820° C. for 3600 seconds, and then was pretreated by normalizing. The steel bar was heated at 1000° C. for 400 seconds, and then was cooled to temperature T(° C.) shown in Table 2 at a cooling rate of about 100° C./s, and after leaving for time t (sec.) shown in Table 2, it was cooled by water-cooling to room temperature at a cooling rate of about 50° C./s. With respect to the steels produced as described above, distinction of phases, tensile strength and fracture elongation were examined by the following methods.

TABLE 1

| Steels | Chemical Compositions (mass %), Residue consists of Fe and Unavoidable Impurities | | | | | | Ac3 (°C.) | Ms (°C.) | Notes |
| --- | --- | --- | --- | --- | --- | --- | --- | --- | --- |
| | C | Si | Mn | Cr | P | S | | | |
| A | 0.57 | 1.40 | 0.8 | 0.70 | 0.01 | 0.01 | 806 | 282 | Example |
| B | 0.57 | 2.00 | 0.8 | Tr. | 0.01 | 0.01 | 813 | 263 | Comparative Example |
| C | 0.57 | 0.20 | 0.8 | 0.70 | 0.01 | 0.01 | 775 | 270 | Comparative Example |

Distinction of Phases

By comparing an optical microphotograph and a crystal orientation map calculated by the EBSD (Electron Back Scattering Diffraction) method with respect to the same portion of the steel, black and gray portions on the optical microphotograph were confirmed as bainite and white portions on the optical microphotograph were confirmed as martensite or retained austenite, and therefore, the distinction of phase was carried out. Then, the area ratio of bainite and total area ratio of martensite and retained austenite were calculated by an image processing. In addition, area ratio of retained austenite was calculated by an X-ray diffraction method, using buffing finished steels. The area ratio of martensite was obtained by subtracting retained austenite area ratio calculated by the X-ray diffraction from the total area ratio of martensite and retained austenite calculated by the optical microphotograph.

Average C content in retained austenite was calculated according to the following relational expression, using lattice constant a (nm) obtained from each diffraction peak angle of (111), (200), (220) and (311) of austenite measured by an X-ray diffraction. These results are shown in Table 2.

$$a \text{ (nm)} = 0.3573 + 0.0033 \times (C \text{ mass \%})$$

Tensile Strength and Fracture Elongation

A test piece in a round bar shape (according to Japanese Industrial Standard 14A) having diameter of parallel portion of 6 mm and distance between gauge marks of 30 mm was produced by cutting work, and with respect to this test piece, tensile strength was obtained by carrying out a tensile test. In addition, the fracture elongation was obtained by using test pieces after fracture. These results are shown in Table 2.

TABLE 2

| No. | Steels | T (°C.) | t (sec.) | Bainite (B) Area Ratio (%) | Retained Austenite ($\gamma_R$) Area ratio (%) | C Content in Retained Austenite (mass %) | Tensile Strength (MPa) | Fracture Elongation (%) | Parameter Z | Notes |
| --- | --- | --- | --- | --- | --- | --- | --- | --- | --- | --- |
| 1 | A | 250 | 300 | 41.9 | 8.1 | 0.52 | 1810 | 1.2 | 2172 | Comparative Example |
| 2 | A | 250 | 600 | 52.9 | 8.8 | 0.50 | 2090 | 1.1 | 2299 | Comparative Example |
| 3 | A | 250 | 2400 | 73.2 | 13.6 | 0.55 | 1976 | 1.5 | 2964 | Comparative Example |
| 4 | A | 300 | 180 | 0.2 | 8.5 | 0.52 | 1780 | 1.4 | 2492 | Comparative Example |
| 5 | A | 300 | 300 | 5.8 | 9.2 | 0.59 | 1837 | 1.1 | 2021 | Comparative Example |
| 6 | A | 300 | 600 | 68.7 | 11.3 | 0.68 | 2056 | 8.8 | 18093 | Example |
| 7 | A | 300 | 1200 | 78.3 | 10.1 | 0.76 | 1931 | 11.2 | 21627 | Example |
| 8 | A | 300 | 2400 | 84.8 | 8.6 | 1.17 | 1806 | 10.6 | 19144 | Example |
| 9 | A | 300 | 3600 | 86.1 | 7.7 | 1.41 | 1810 | 9.4 | 17014 | Example |
| 10 | A | 300 | 10800 | 88.3 | 6.4 | 1.44 | 1835 | 10.1 | 18534 | Example |
| 11 | A | 350 | 180 | 24.3 | 10.7 | 1.46 | 1805 | 3.6 | 6498 | Comparative Example |
| 12 | A | 350 | 300 | 48.2 | 13.9 | 1.34 | 1719 | 6.5 | 11174 | Comparative Example |
| 13 | A | 300 | 600 | 73.1 | 16.0 | 1.49 | 1516 | 13.0 | 19708 | Comparative Example |
| 14 | A | 350 | 2400 | 74.9 | 19.6 | 1.56 | 1433 | 16.4 | 23501 | Comparative Example |
| 15 | B | 300 | 90 | 20.7 | 6.3 | 1.01 | 1938 | 1.9 | 3682 | Comparative Example |
| 16 | B | 300 | 300 | 60.1 | 11.3 | 1.22 | 1836 | 7.3 | 13403 | Comparative Example |
| 17 | B | 300 | 600 | 75.3 | 14.0 | 1.23 | 1634 | 13.0 | 21242 | Comparative Example |
| 18 | C | 300 | 90 | 12.0 | 4.9 | 0.48 | 1910 | 3.3 | 6303 | Comparative Example |
| 19 | C | 300 | 300 | 36.3 | 5.2 | 0.61 | 1615 | 9.6 | 15504 | Comparative Example |
| 20 | C | 300 | 600 | 51.4 | 10.5 | 0.58 | 1610 | 10.0 | 16100 | Comparative Example |

Underlining shows that conditions limited in the present invention were not satisfied.

As is apparent from Table 2, with respect to the test pieces of Nos. 6 to 10 in which total composition and production condition were included within limitations in the present invention, the tensile strength was 1800 MPa or more and the parameter Z was 15000 or more, and therefore, high strength and high ductility was shown.

In contrast, with respect to the test pieces of Nos. 1 to 5 and 11 to 20 in which total composition and production condition deviated from the limitations in the present invention, the tensile strength and/or of parameter Z do not satisfy standard values. That is, in the test pieces of Nos. 1 to 5, the C content in retained austenite was low, and the standard value of parameter Z limited in the present invention was not obtained. Furthermore, in the test piece of No. 4, standard value of tensile strength limited in the present invention was not obtained, since the bainite area ratio was remarkably low. In the test piece of No. 11, standard value of parameter Z limited in the present invention was not obtained, since the bainite area ratio was low. In the test pieces of Nos. 12 to 14, standard values of tensile strength limited in the present invention was not satisfied, since the retained austenite area ratio was too high. In the test pieces of Nos. 15 to 17 in which Si content of the steel was more than the upper limit in the present invention, the standard value of parameter Z was not satisfied, since bainite area ratio was low (Nos. 15 and 16), or standard value of tensile strength limited in the present invention was not satisfied, the retained austenite area ratio was too high (No. 17). In addition, in the test pieces of Nos. 18 to 20 in which Si content of the steel was less than the lower limit in the present invention, the fracture elongation was small and the standard value of parameter Z was not satisfied, since the C content in retained austenite was low (No. 18), or the standard value of tensile strength of the present invention was not satisfied, since strength of the used steel was low (Nos. 19 and 20).

The invention claimed is:

1. A steel for a spring, consisting of, by mass % as an overall composition:
   C: 0.5 to 0.6%,
   Si: 1.0 to 1.8%,
   Mn: 0.1 to 1.0%,
   Cr: 0.1 to 1.0%,
   P: 0.035% or less,
   S: 0.035% or less, and
   a balance of iron and inevitable impurities,
wherein
   an area ratio of an internal structure on a cross section comprises
      bainite: 65% or more,
      retained austenite: 6 to 13%, and
      a balance of martensite, and
   an average C content in the retained austenite is 0.65 to 1.7%.

2. The steel for a spring according to claim 1, wherein the tensile strength of the steel is 1800 MPa or more, and a Paramater Z defined below is 15000 or more:

Parameter Z=(Tensile Strength (MPa))×(Fracture Elongation (%)).

3. The steel for a spring according to claim 1, wherein the steel is a steel wire having a diameter of 1.5 to 15 mm.

4. A method for producing the steel for a spring according to claim 1, comprising:
   austenitizing at a temperature of more than $Ac_3$ point and ($Ac_3$ point+250° C.) or less a steel consisting of by mass % as the overall composition:
      C: 0.5 to 0.6%,
      Si: 1.0 to 1.8%,
      Mn: 0.1 to 1.0%,
      Cr: 0.1 to 1.0%,
      P: 0.035% or less,
      S: 0.035% or less, and
      a balance of iron and inevitable impurities,
   cooling at a cooling rate 20° C./s or more,
   holding at a temperature of more than Ms point and (Ms point+70° C.) or less for 400 to 10800 seconds, and
   cooling to room temperature at a cooling rate of 20° C./s or more.

* * * * *